United States Patent [19]

Troiano

[11] 4,376,952
[45] Mar. 15, 1983

[54] NOISE RESPONSIVE AUTOMATIC PEAKING CONTROL APPARATUS

[75] Inventor: Anthony Troiano, Princeton Junction, N.J.

[73] Assignee: RCA Corporation, New York, N.Y.

[21] Appl. No.: 288,627

[22] Filed: Jul. 30, 1981

[51] Int. Cl.³ .............................................. H04N 5/14
[52] U.S. Cl. .................................... 358/166; 358/167; 358/36; 358/38
[58] Field of Search .................... 358/166, 167, 36, 38

[56] References Cited

U.S. PATENT DOCUMENTS

| | | | |
|---|---|---|---|
| 3,919,714 | 11/1975 | Bingham | 358/38 |
| 3,971,064 | 7/1976 | Milbourn | 358/38 |
| 3,984,631 | 10/1976 | Avicola | 178/7.3 R |
| 4,081,836 | 3/1978 | Skinner | 358/166 |
| 4,090,217 | 5/1978 | Goyal et al. | 358/37 |
| 4,189,755 | 2/1980 | Babbes et al. | 358/904 |

Primary Examiner—Richard Murray
Attorney, Agent, or Firm—E. M. Whitacre; J. S. Tripoli; R. G. Coalter

[57] ABSTRACT

Apparatus is described for automatically depeaking the luminance signal of a television receiver under high noise conditions to improve the subjective appearance of reproduced images. Noise accompanying the luminance signal is sensed by bandpass filtering the signal and applying the filtered signal to a detector via a sampling circuit. The sampling circuit is enabled only during the horizontal blanking interval of the luminance signal to reject the active video portions of the luminance signal. The detector is of the pulse averaging type wherein pulses representative of peaks of the sampled signal above a threshold level are generated and averaged to produce a smoothed control signal that is principally representative of the noise and substantially independent of luminance signal transitions which occur during the sampling interval. The control signal is applied to a peaking control circuit in the receiver in a sense to vary the luminance signal peaking inversely with changes in the noise level whereby the luminance signal is automatically depeaked under high noise conditions.

4 Claims, 8 Drawing Figures

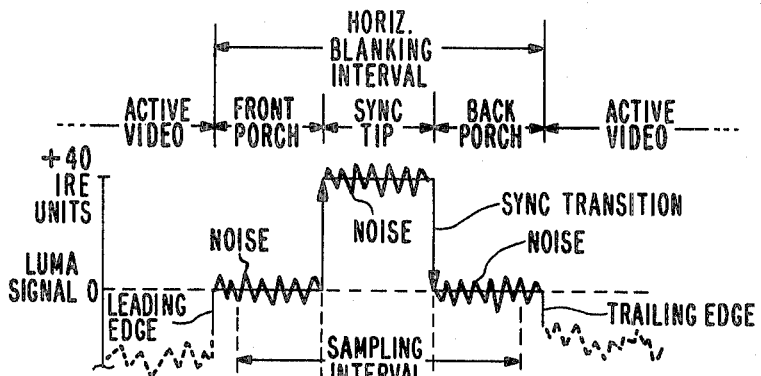
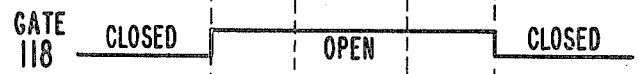
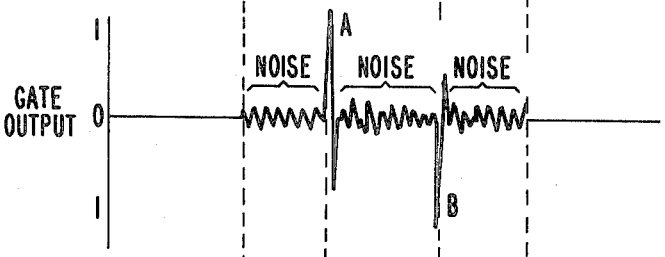
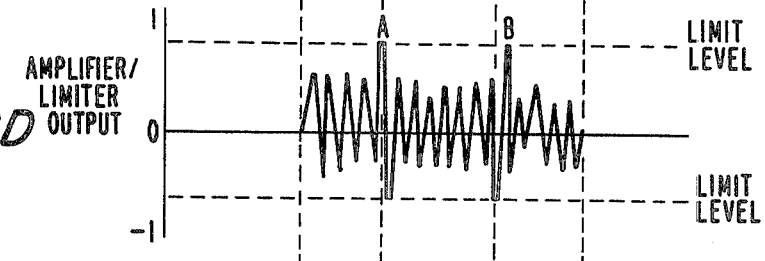
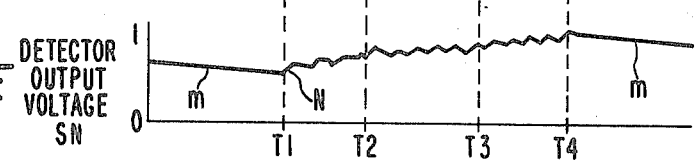

NOISE RESPONSIVE AUTOMATIC PEAKING CONTROL APPARATUS

This invention relates to video signal processing apparatus and particularly to apparatus for automatically controlling peaking of a luminance signal in accordance with the level of noise which may accompany the signal.

It is known that a subjective improvement in picture quality may be obtained in a television receiver where the received signal exhibits a poor signal-to-noise ratio by manually or automatically depeaking the video signal. Arrangements for automatically adjusting the luminance signal peaking in response to changes in the signal-to-noise ratio of the received television signal have been proposed. See, for example, U.S. Pat. Nos. 3,984,631; 4,081,836; and 4,090,217, wherein the AGC (automatic gain control) voltage of the receiver is used as a measure of the video signal-to-noise ratio.

Although the AGC voltage of a television receiver has been found to fairly reflect the quality of television signals received from a source such as an antenna, it is recognized herein that it does not consistently provide a good indication of signal-to-noise ratio where the signal is provided by a video accessory (e.g., a tape or disc player) of the type in which the RF (radio frequency) output signal is effectively regulated at a substantially constant level. In such a case, the AGC voltage may remain substantially constant regardless of the quality (noise level) of the signal supplied to the receiver so that the advantages of automatic control of peaking are lost.

Parameters other than AGC voltage have also been proposed for control of picture sharpness in television receivers. In U.S. Pat. No. 3,919,714, for example, the video signal burst amplitude is used for peaking control and in U.S. Pat. No. 4,189,755, a tuned filter (following the receiver IF stage) is controlled by signals derived from measurements of the tip and blanking level of the horizontal synchronizing signal. These arrangements also perform well for "off air" received signals but are less effective where the input signal is from a video accessory in which the synchronizing or burst signals are regenerated or otherwise processed so as to be maintained at fixed or regulated levels.

It is, therefore, an object of the present invention to provide automatic peaking control apparatus which overcomes the aforementioned problems and which features improved noise detection sensitivity.

Peaking control apparatus embodying the invention includes signal source means for providing a luminance signal inclusive of a noise component and peaking means responsive to the luminance signal and to a peaking control signal supplied thereto for providing a variably peaked luminance output signal. A filter means having a passband inclusive of the noise component is coupled to the signal source means for providing a filtered luminance signal. Sampling means samples the filtered luminance signal solely during the horizontal blanking interval thereof to produce a sampled signal substantially devoid of active video components. A detector means, responsive to the sampled signal, produces a detector output signal corresponding to the peaks of the sampled signal for providing a noise level indicating signal that is substantially independent of luminance signal transitions which occur during the horizontal blanking interval. A circuit means responsive to the noise level indicating signal supplies the peaking control signal to the peaking means.

In accordance with a further aspect of the invention, the apparatus includes control means for manually controlling peaking of the luminence signal.

The above and further aspects of the invention are described hereinafter and illustrated in the accompanying drawings wherein like elements are denoted by like reference designators and in which:

FIGS. 2A-2E are waveform diagrams illustrating certain aspects of operation of the peaking control apparatus of FIG. 1.

Figure 1:
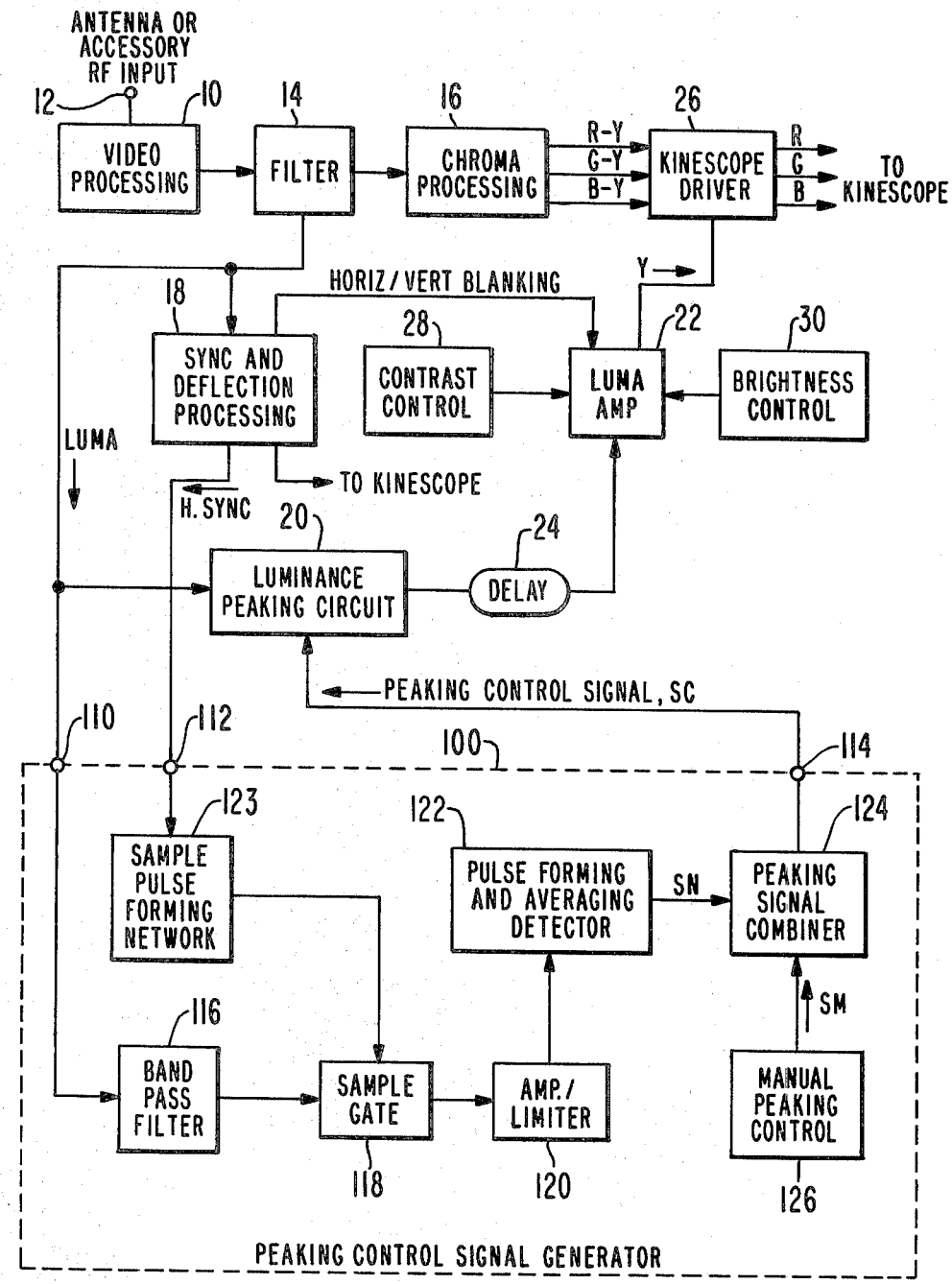
FIG. 1 is a block diagram of a television receiver including automatic peaking control apparatus embodying the invention.

The television receiver of FIG. 1 comprises a video signal processing unit 10 responsive to radio frequency (RF) television signals applied to an antenna input terminal 12 for generating (by means of suitable tuner, IF, detection and AGC circuits, not shown) a composite video signal comprising chrominance and luminance signal components. Terminal 12 may be coupled to an antenna for receiving RF signals which may vary in amplitude or it may be coupled to a video accessory (e.g., a disc or tape player) for receiving RF signals of relatively constant amplitude.

The composite video signal produced by processing unit 10 is coupled to a filter 14 (preferably, a comb filter) which separates the luminance and chrominance signals from the composite video signal. The chrominance signal is applied to a chrominance signal processing unit 16 which includes circuitry for deriving R-Y, B-Y and G-Y color difference signals from the chrominance signal.

The luminance output signal of filter 14 is applied to a sync and deflection processing unit 18, to a luminance peaking circuit 20 and to input terminal 110 of a peaking control signal generator 100 (outlined in phantom). Unit 18 supplies horizontal and vertical blanking signals to a luminance amplifier unit 22, high voltage (H.V.) to a kinescope (not shown) and horizontal synchronizing signals to an input terminal 112 of generator 100 which has an output terminal 114 coupled to the peaking control input of circuit 20 for supplying a peaking control signal, SC, thereto. Circuit 20 varies the peaking of the luminance signal supplied to its other input in accordance with the level of signal SC (as will be explained in detail, subsequently) to supply a variably peaked output luminance signal to luminance amplifier 22 via a delay element 24. Examples of controllable luminance peaking circuits are given, for example, in the aforementioned Bingham patent (U.S. Pat. No. 3,919,714).

The purpose of delay element 24 is to equalize or compensate for delay differences between the chrominance and luminance signal processing channels of the receiver, thereby maintaining proper registration of reproduced images. Delay differences exist principally because of signal bandwidth differences between the two channels with the chrominance channel having the narrower bandwidth (e.g., 0.5 MHz or so) as compared with that of the luminance channel (e.g., 3-4 MHz or so). Delay element 24 may be a conventional delay line, CCD shift register or some other suitable delay means and may precede rather than follow luminance peaking circuit 20 in the luminance signal processing path of the receiver.

Luminance amplifier 22 serves to amplify and otherwise process the variably peaked luminance signal to produce an output luminance signal, Y. The Y output signal and the R-Y, G-Y and B-Y color difference output signals of chrominance processor 16 are coupled to a kinescope driver 26 where they are matrixed to form R, G, and B color signals for driving the kinescope. Alternatively, the luminance and color difference signals may be matrixed in the kinescope as is known. A contrast control unit 28 is coupled to luminance amplifier 22 to control the amplitude of the luminance signal and thereby control the contrast of reproduced images. Contrast control unit 28 may also be coupled to chrominance processing unit 16 to control the amplitude of the chrominance signals and thereby control the color saturation level of reproduced images. A brightness control unit 30 is also coupled to luminance amplifier 22 to control the D.C. content of the luminance signal and thereby control the brightness of reproduced images.

Peaking control signal generator 100 comprises a bandpass filter 116 having an input coupled to terminal 110 for receiving the luminance signal produced by filter 14 and an output for providing a bandpass filtered luminance output signal. Illustratively, filter 116 may have a center frequency of about 2.7 MHz and a bandwidth of a few hundred kilo-Hertz. Such a passband has been found sufficient to include the more objectional components of noise which may accompany the luminance signal. In other words, for purposes of detecting the noise component of the luminance signal, it is preferable that the passband of filter 116 be restricted to the midband portion of the luminance signal thereby reducing the effects of: (1) low frequency luminance signal changes; and (2) undesired high frequency components which may be in luminance signal (e.g., residual chrominance or sound carrier components). Such effects tend to undesirably bias the result of the noise measurement and it is the noise accompanying the luminance signal, not the luminance signal itself, which is of principal concern for purposes of the present invention.

The filtered luminance signal produced by filter 116 is applied via a sample gate 118 and an amplifier/limiter circuit 120 to the input of a pulse forming and averaging detector 122. Gate 118 is controlled by a sample pulse forming network 124 having an input connected to terminal 112 for receiving horizontal synchronizing pulses. The function of network 124 is to enable gate 118 solely during the horizontal blanking interval of the luminance signal whereby gate 118 supplies a sampled luminance signal to amplifier/limiter 120 that is devoid of active video components of the luminance signal. For this purpose, network 124 may comprise a monostable multivibrator having a quasi-stable state less than the horizontal blanking interval and triggered by the horizontal synchronizing pulse supplied to terminal 112.

Preferably, however, the trigger pulse for pulse forming network 124 is delayed slightly (e.g., a microsecond or so) to assure that gate 118 samples only the central portion of the horizontal blanking interval to thereby provide a sample of the horizontal blanking interval which excludes leading and trailing edges of the blanking pulse. This is illustrated by FIGS. 2A and 2B where (from FIG. 2B) it is seen that gate 118 is opened only during the central portion of the horizontal blanking interval of the luminance signal (FIG. 2A, times T1-T4). Thus, beginning and ending transitions of the horizontal blanking pulse as well as active video portions of the luminance signal are excluded from the noise measurement thereby producing a bandpass filtered and sampled luminance signal at the output of gate 118 as shown in FIG. 2C.

At this point, it is instructive to note that the bandpass filtered and sampled luminance signal produced by gate 118 (FIG. 2C) still includes components (i.e., the large spikes or pulses at times T2 and T3) representative of the leading and trailing edges of the sync tip interval of the horizontal blanking pulse as well as the desired noise component. These pulses (A and B of FIG. 2C) are not representative of the noise level of the luminance signal and, if not compensated for, would undesirably tend to bias the noise measurement of the luminance signal. One might consider the possibility of simply blanking or disabling gate 118 during the sync tip transition intervals but this is unsatisfactory for two reasons. First, it reduces the noise sample time interval (T1-T4) of the peaking control signal generator, thus reducing the sensitivity or accuracy of the noise measurement and, secondly, time base errors (i.e., jitter) of the luminance signal or component drift problems could displace the blanking interval to such an extent that the luminance transition pulses would still be passed by gate 118 thereby reducing the accuracy of the noise measurement.

The effect of sync tip transitions during the sampling interval T1-T4 is minimized in generator 100 by use of a detector (122) of the pulse forming and averaging type. As will be explained, the sync tip transition pulses A or B do, in fact, influence the level of the detector output signal but since they are of short duration relative to the total sampling interval (T1-T4) the effect after averaging is minimal and thus the output of detector 122 is a noise level indicating signal that is substantially independent of luminance signal transitions which occur during the horizontal blanking interval.

In more detail, the output of gate 118 (FIG. 2C) is applied to detector 122 via amplifier/limiter 120 which amplifies both the noise accompanying the sampled signal and the pulses A and B caused by the luminance sync tip transitions. Large transitions of pulses A and B are limited or "clipped" in amplifier/limiter 120 so that in the resultant signal (FIG. 2D) the noise and the clipped pulses A and B are of comparable amplitudes.

Detector 122 produces and averages pulses representative of peaks of the signal produced by amplifier/limiter 120 which exceed a first threshold level, Vt, to produce a noise level indicating signal, SN, represented by FIG. 2E. During the time that sample gate 118 is open, the detector output voltage decreases at a relatively low rate, m, but when gate 118 is closed, the detector output increases at a relatively fast rate, N, in proportion to the amplitude of the noise and transition induced pulses A and B which exceed the threshold voltage level Vt.

Summarizing to this point, sample gate 118 which is enabled (closed) only during the central portion of the horizontal blanking interval assures that the noise level indicating signal, SN, is devoid of any component occuring during the active video portion of the luminance signal as well as leading and trailing edges of the horizontal blanking pulse. Detector 122 forms pulses from the sampled signal and averages the pulses to produce a smoothed control signal, SN, representative of peaks of the sampled signal which exceed the threshold voltage Vt. Even through the signal SN is influenced to a certain extent by the sync tip transition pulses A and B, the effect is minimal on signal SN because pulses A and B are of relatively short duration as compared with the sampling interval T1–T4 which includes the major portion of the horizontal blanking interval. The accuracy of the noise level indicating signal is further improved by amplification and limiting of the gated signal prior to detection which tends to further minimize the effect of the sync tip transition pulses A and B.

The noise level indicating signal SN is combined in a peaking signal combiner 124 with a manual peaking control signal SM produced by a manual peaking control circuit 126 and the resultant peaking control signal SC is supplied to output terminal 114 for controlling luminance signal peaking circuit 20. The operation of combiner 124 is such that the peaking control signal SC is supplied to peaking control circuit 20 in a sense to decrease the peaking of the luminance signal for increases in the magnitude of the noise level indicating signal above a threshold level set by manual peaking control circuit 126. The purpose of circuit 126 is to allow the user of the receiver of FIG. 1 to set a preferred peaking level. When the noise exceeds the user set threshold level, combiner 124 decreases the peaking to soften the displayed image under such high noise conditions.

Figure 3:
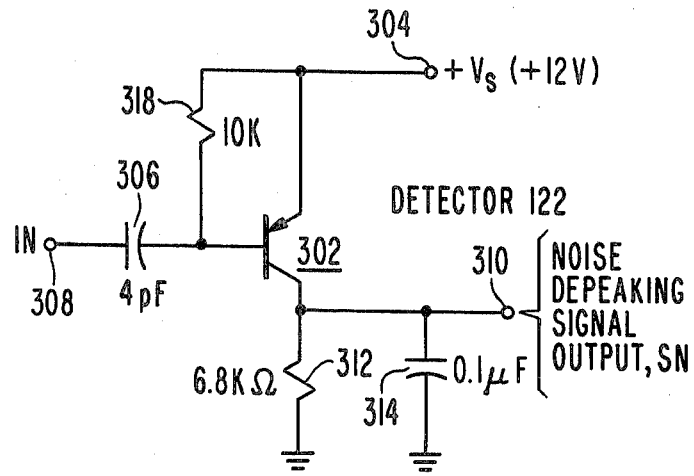
FIGS. 3 and 4 are schematic diagrams of a pulse counting detector and a peaking signal combiner, respectively, suitable for use in the peaking control apparatus of FIG. 1.

FIG. 3 illustrates a suitable circuit implementation of detector 122 which provides the triple functions of: (1) detecting peaks of the signal produced by amplifier/limiter 120 which exceed the first threshold voltage Vt; (2) forming signal pulses from the detected peaks; and (3) smoothing the pulses to produce the noise level indicating signal SN.

The circuit comprises a PNP transistor 302 having an emitter electrode connected to a terminal 304 for receiving a source of supply voltage +Vs (12 volts), a base electrode coupled via a capacitor 306 to an input terminal 308 for receiving the output signal (FIG. 2D) of amplifier/limiter 120 and a collector electrode coupled to an output terminal 310 and via a load resistor 312 and a smoothing capacitor 314 to ground. A resistor 318 is connected between the emitter and base electrodes of transistor 302. Suitable values for resistors 312 and 318 and capacitors 306 and 314 are indicated on the drawing.

In operation, resistor 318 normally biases transistor 302 off. Negative excursions of the signal applied to terminal 308 which exceed the threshold voltage (Vbe) of transistor 302 turn transistor 302 on briefly to supply a pulse of charging current to smoothing capacitor 314. The duration of the current pulse is determined mainly by the product of the values of resistor 318 and coupling capacitor 306. Capacitor 314 accumulates and smoothes the current pulses produced by transistor 302 during the interval that gate 118 is closed, thereby producing an increase in output voltage at terminal 310 during the time interval T1–T4. When gate 118 is opened, no signal is applied to terminal 308 and capacitor 314 discharges at a relatively slow rate via resistor 312.

Figure 4:
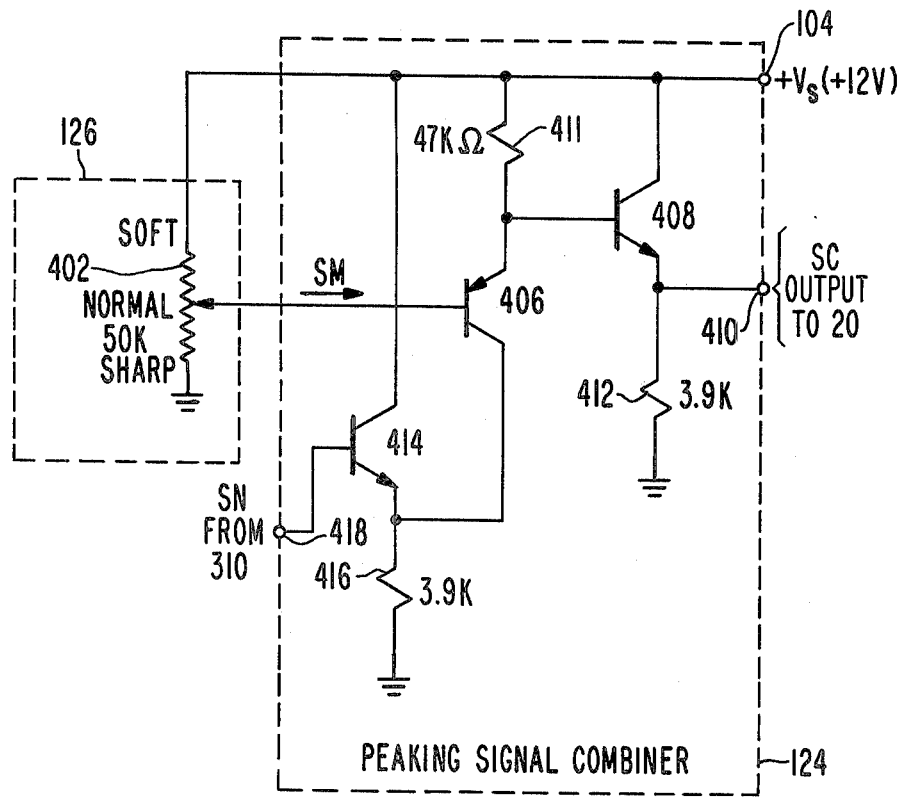

FIG. 4 illustrates a suitable circuit implementation of manual peaking control 126 and peaking signal combiner 124 (each outlined in phantom). Control 126 comprises a potentiometer 402 connected between a supply voltage terminal 404 (for receiving a source of supply voltage +Vs) and ground. The wiper of potentiometer 402 provides a manual peaking control voltage to combiner 124 which is coupled via cascade connected complementary (PNP and NPN) emitter follower transistors 406 and 408 to a peaking control signal output terminal 410. The emitter of transistor 406 is connected to the base of transistor 408 and to terminal 404 via an emitter load resistor 411. The collector of transistor 408 is connected to terminal 404 and its emitter is connected to terminal 410 and, via an emitter load resistor 412, to ground. Collector voltage for transistor 406 is provided and controlled by means of a further emitter follower transistor 414 having an emitter electrode connected to the collector electrode of transistor 406 and to ground via an emitter load resistor 416. The collector and base electrodes of transistor 414 are respectively connected to supply terminal 404 and to a noise depeaking control signal input terminal 418. Suitable values for all resistors are indicated on the drawing.

In operation, emitter follower transistor 414 controls the collector voltage of transistor 406 in proportion to the noise level indicating signal, SN, applied to terminal 418. As long as SN is less than the manual peaking control signal, SM, transistors 406 and 408 couple SM to terminal 410, thereby controlling peaking of the luminance signal manually. Increases in SM soften or depeak the luminance signal and decreases in SM sharpen or peak the luminance signal. The offset voltage (+Vbe) of transistor 406 is compensated for by the equal and opposite offset voltage (−Vbe) of transistor 408.

When the noise accompanying the luminance signal increases to the extent that SN approaches the value of SM, transistor 406 will lack sufficient collector voltage to operate as an emitter follower and the output voltage at terminal 410 will therefore increase in accordance with further increases of the signal SN, thereby decreasing the luminance signal peaking. The signal SM thus controls the threshold of combiner 124 at which automatic depeaking occurs.

Luminance signal peaking circuit 20 in this example of the invention is assumed to vary peaking inversely with the control SC. The signal SC may be inverted if circuit 20 is of a type which varies peaking directly with changes in the signal SC.

In summary, the setting of the wiper of potentiometer 402 controls the manual peaking signal SM and thus the threshold of combiner 124 at which automatic depeaking occurs. Transistor 406 provides the dual functions of: (1) acting as an emitter follower when SN is less than SM for providing manual peaking control and; (2) acting as a comparator or analog gate for coupling SN to terminal 410 when SN exceeds SM. Transistors 414 and 406 may be replaced by a two input non-additive mixer if desired in a given application. The non-additive mixer may be of either the NPN or the PNP type depending on the desired polarity of the output signal or it may be a diode type of non-additive mixer. As is known, a non-additive mixer is a circuit which passes the greater, in a given sense, of two (or more) input signals to an output terminal and this is the function provided by transistors 414 and 406 in combiner 124.

What is claimed is:
1. Peaking control apparatus, comprising:
signal source means for providing a luminance signal inclusive of a noise component;
peaking means responsive to said luminance signal and to a peaking control signal supplied thereto for providing a variably peaked luminance output signal;
bandpass filter means having a passband within a midband portion of the luminance signal band and inclusive of said noise component and said filter means being coupled to said signal source means for providing a bandpass filtered luminance noise signal;

sampling means for sampling said bandpass filtered luminance noise signal solely during the horizontal blanking interval thereof to produce a sampled noise signal substantially devoid of active video components;

detector means responsive to said sampled noise signal for producing a detector output signal corresponding to the peaks of said sampled noise signal for providing a noise level indicating signal substantially independent of luminance signal transitions which occur during said horizontal blanking interval; and circuit means responsive to said noise level indicating signal for supplying said peaking control signal to said peaking means.

2. Apparatus as recited in claim 1 wherein said detector output signal corresponds to peaks of said sampled signal above a first threshold level.

3. Apparatus as recited in claim 2 wherein said peaking control signal effects a decrease in the peaking of said luminance output signal when the magnitude of said noise level indicating signal exceeds a second threshold level.

4. Apparatus as recited in claim 3 further comprising manual peaking control means coupled to said circuit means for manually controlling said second threshold level.

* * * * *